Nov. 9, 1965    A. E. SUNDIN    3,216,588
LOADING APPARATUS
Filed Feb. 26, 1962    2 Sheets-Sheet 1
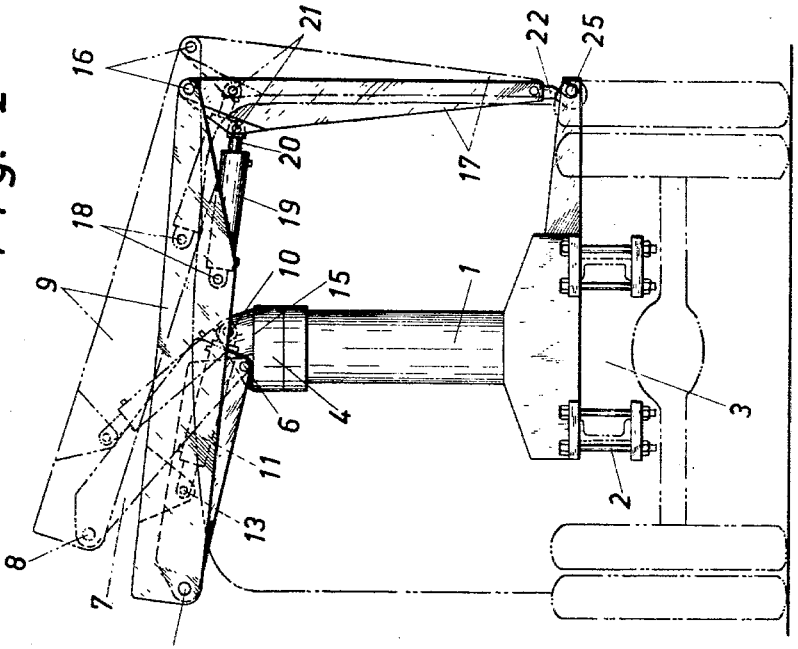
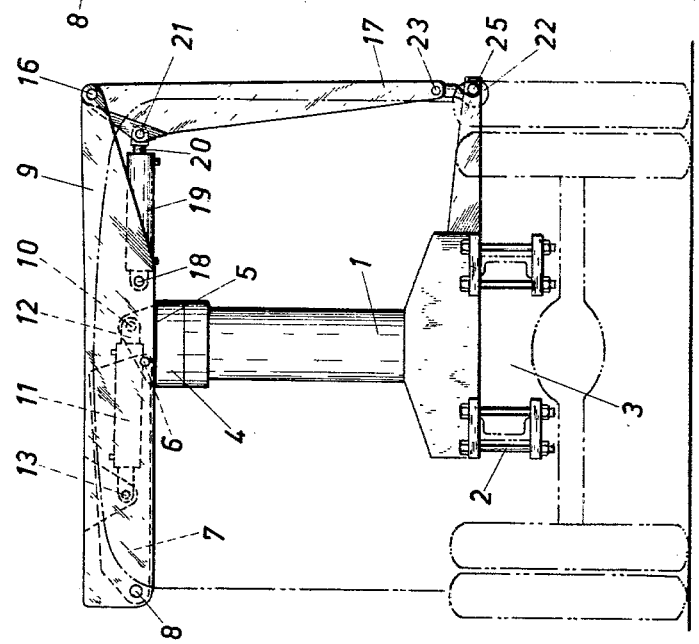
INVENTOR
Anders Erik Sundin
BY

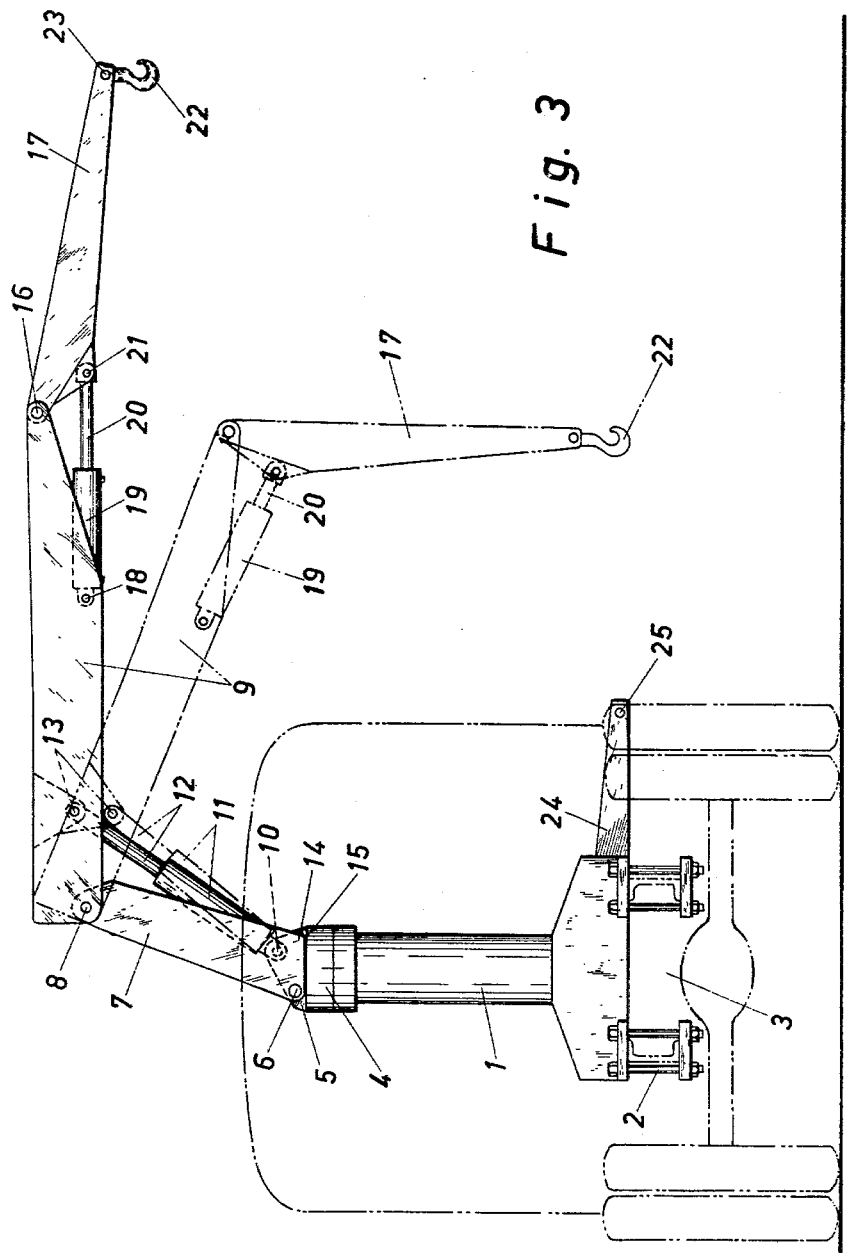

United States Patent Office 3,216,588
Patented Nov. 9, 1965

3,216,588
LOADING APPARATUS
Anders Erik Sundin, Hudiksvall, Sweden, assignor to Hydrauliska Industri Aktiebolaget, Hudiksvall, Sweden, a corporation of Sweden
Filed Feb. 26, 1962, Ser. No. 175,725
Claims priority, application Sweden, Feb. 27, 1961, 2,032/61
7 Claims. (Cl. 212—35)

This invention has reference to loading apparatus for use on lorries, trucks and similar vehicles and of the kind comprising a loading beam which is swingable in a vertical plane relatively to the stand post or body of the loading apparatus.

The main feature of the invention is to be seen therein that the loading beam is with one end journalled to the upper end of a stand arm having its lower end journalled on a stand head turnable about said stand post or body and adapted to be swung together with the loading beam from an essentially horizontal position to a raised position, this position being limited by a stop abutment. Such a device makes it possible when the stand arm is raised to obtain considerable lifting heights while the stand arm in lowered position together with the loading beam will be completely hidden behind the driver's cabin of the vehicle and also will not protrude beyond the sides of the vehicle. In the lowered position the loading apparatus requires very little space.

Principally it is of course possible manually to swing the stand arm from raised to folded position and vice versa but according to a preferred embodiment of the invention an hydraulic cylinder is with one end journalled to the turnable stand head at a distance from the carrying shaft of the stand arm on said stand head and a piston which is axially movable in said cylinder is with its outer end journalled to the loading beam at a distance from its carrying shaft on the stand arm. When using a double-acting hydraulic piston and cylinder it is possible to swing the stand arm between its two end positions by means of hydraulic power.

An example of a device in accordance with the invention will now be described with reference to the accompanying partly diagrammatic drawings, in which:

FIG. 1 is a rear elevation of a lorry having a loading apparatus according to the invention with the stand arm and loading beam in folded position, FIG. 2 shows the stand arm with the associated details in partly raised position, and FIG. 3 shows the stand arm in completely raised position with the loading beam in different operating positions.

Referring now to the partly diagrammatic drawings, it is seen that the hydraulic pump with its control devices and conduits has been omitted so as not to complicate the drawings unnecessarily. The vertical stand post or body 1 of the loading apparatus is by means of bolts 2 attached to the chassis 3 of the vehicle. The stand post 1 carries for rotation a stand head 4 the upper portion of which is shaped as a fork 5. On either side of the branches of the fork 5 (not shown in detail on the drawings) there is on a cross shaft 6 according to FIG. 3 journalled the lower end of a stand arm 7 in such a way that said arm can be swung in vertical planes relatively to the stand post 1. The stand arm 7 has on its upper end a transverse shaft 8 on which one end of a loading beam 9 is journalled. One end of an hydraulic cylinder 11 is journalled between the two branches of the fork 5 on a cross shaft 10. A piston 12 is axially movable in the cylinder 11 and is with its outer end by means of a cross shaft 13 journalled to the loading beam 9. The shaft 13 is arranged at a distance from the shaft 8 and the shaft 10 is situated at a distance from the shaft 6. The shafts 6, 10, and 13 are situated in the corners of an imaginary triangle when the stand arm 7 is in folded position (FIG. 1). The hydraulic piston and cylinder 12, 11 are double-acting. The shaft 6 is situated at one corner of the lower end of the stand arm 7 according to FIG. 3, and the other corner 14 situated below the loading beam 9 serves as a stop abutment for limiting the raising movement of the stand arm 7 by abutting against a shoulder 15 on the upper end of the turnable stand head 4.

The loading beam 9 carries on its outer end a transverse shaft 16 and an elongation arm 17 is with one end journalled to the loading beam 9 by means of this shaft 16. An hydraulic cylinder 19 is with one end journalled about a cross shaft 18 on the loading beam 9 and a piston 20 is axially movable in the cylinder 19. The piston 20 is by means of a transverse shaft 21 with its outer end journalled on the elongation arm 17 at a place situated somewhat below the shaft 16. The outer end of the elongation arm 17 carries a loading hook 22 which by means of a bolt 23 or an analogous device is journalled to the elongation arm. The stand post 1 is provided with an arm 24 extending sidewards and having on its outer end a rod 25, loop or the like for a releasable attachment of the hook when the elongation arm 17 is swung completely down and the stand arm 7 is in horizontal position (FIG. 1).

It is easily understood from the drawings that, by means of the double-acting hydraulic pistons and cylinders 12, 11, and 20, 19 it is possible to swing the stand arm 7 together with the loading beam 9 from the inoperative position (in the vehicle driving position) in FIG. 1 to the operative position in FIG. 3 and vice versa. This is possible due to the fact that the shafts 6, 10, and 13 and also the shafts 16, 18, and 21 in the inoperative position according to FIG. 1 are situated in the corners of two "power triangles." At the raising of the stand arm 7 (see FIG. 2) the elongation arm 17 may serve as a doll thereby that during the lifting movement the hook 22 is engaged and retained by the rod 25 or an analogous device. Also when the stand arm 7 is lowered, the loading beam 9 is swung with its elongation arm 17 to begin with in such a way that the hook 22 is caught by the rod 25. When thereupon by means of the hydraulic pressure medium forced into the cylinder 19 the piston 20 is forced inwards of the cylinder 19 and simultaneously the pressure medium in the cylinder 11 forces the piston 12 inwards in said cylinder, the stand arm 7 is swung in counter-clockwise direction according to the drawings to the horizontal position (FIG. 1).

The loading beam 9 has preferably a length corresponding to the width of the vehicle and the stand arm 7 has preferably such dimensions and is arranged in such a way that the loading beam in its lower horizontal position with its ends does not extend beyond the sides of the lorry.

The present invention has been described in detail above for purposes of illustration only and is not intended to be limited by this description or otherwise except as defined in the appended claims. Thus, the different details of the loading apparatus can be constructively modified in many ways within the scope of the invention. The hydraulic devices for swinging the stand arm 7, the loading beam 9 and the elongation arm 17 are not of essential importance for the invention and could be varied in many ways. Further, these three details could be journalled in another way than shown in the drawings. The apparatus can if desired be provided with a separate hydraulic or mechanical device for raising or lowering the stand arm 7. The rotational stand head 4 could be shaped as an hydraulic lifting piston axially movable in the stand head or body 1 which in such a case would have the shape of an hydraulic cylinder.

What I claim is:

1. Loading apparatus comprising a vertical stand post, a stand arm having one end pivotally mounted on the upper end of said stand post for movement in a vertical plane, a loading beam having one end pivotally connected to the other end of said stand arm for movement in a vertical plane, a first locking member associated with the other end of said loading beam, a second locking member associated with said stand post and adapted to engage said first locking member in locking relation, and means pivotally associated with the upper end of said stand post and with said one end of the loading beam and adapted to swing said stand arm between a substantially horizontal position and a substantially vertical position when said two locking members are engaged in locking relation.

2. Apparatus according to claim 1, in which said swinging means comprises a double-acting hydraulic cylinder-piston unit having one end pivotally mounted on the upper end of said stand post and the other end pivotally connected to said loading beam adjacent said one end thereof.

3. Loading apparatus comprising a vertical stand post, a stand head mounted on the upper end of said stand post for rotation in a horizontal plane, a stand arm having one end pivotally mounted on said stand head for movement in a vertical plane, a loading beam having one end pivotally connected to the other end of said stand arm for movement in a vertical plane, a first locking member associated with the other end of said loading beam, a second locking member associated with said stand post and adapted to engage said first locking member in locking relation, and a double-acting hydraulic cylinder-piston unit having one end pivotally mounted on said stand head and the other end pivotally connected to said loading beam adjacent said one end thereof in such a manner as to swing said stand arm between a substantially horizontal position and a substantially vertical position when said two locking members are engaged in locking relation.

4. Apparatus according to claim 3, which includes an elongation arm having one end pivotally connected to the other end of said loading beam for movement in a vertical plane, and in which said first locking member is associated with the other end of said elongation arm.

5. Apparatus according to claim 4, in which said first locking member comprises a hook pivotally mounted on said other end of the elongation arm, and said second locking member comprises a device fixed relatively to said stand post and adapted to be detachably engaged by said hook.

6. Apparatus according to claim 4, which includes a second double-acting hydraulic cylinder-piston unit having one end pivotally connected to said loading beam and the other end pivotally connected to said elongation arm in such a manner as to swing said elongation arm between a retracted position and an extended position.

7. Apparatus according to claim 3, in which said stand head and said one end of the stand arm are each provided with an abutment surface for mutual engagement to limit the swinging of said stand arm to its substantially vertical position.

References Cited by the Examiner

UNITED STATES PATENTS

| | | | |
|---|---|---|---|
| 2,790,568 | 4/57 | Mandt | 212—35 X |
| 3,011,652 | 12/61 | Falk et al. | 212—34 X |
| 3,032,207 | 5/62 | McIntyre | 212—35 |
| 3,047,160 | 7/62 | Paul | 212—35 |
| 3,056,510 | 10/62 | Garnett | 212—59 |

SAMUEL F. COLEMAN, *Primary Examiner.*

KARL J. ALBRECHT, ERNEST A. FALLER, WILLIAM B. LABORDE, *Examiners.*